United States Patent
Laight

(10) Patent No.: US 10,625,450 B2
(45) Date of Patent: Apr. 21, 2020

(54) WIND TURBINE BLADE

(71) Applicant: Vestas Wind Systems A/S, Aarhus N. (DK)

(72) Inventor: Alan Laight, Niton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 636 days.

(21) Appl. No.: 14/904,239

(22) PCT Filed: Jul. 8, 2014

(86) PCT No.: PCT/DK2014/050210
§ 371 (c)(1),
(2) Date: Jan. 11, 2016

(87) PCT Pub. No.: WO2015/003719
PCT Pub. Date: Jan. 15, 2015

(65) Prior Publication Data
US 2016/0167267 A1    Jun. 16, 2016

(30) Foreign Application Priority Data

Jul. 11, 2013   (DK) .................................. 2013 70393

(51) Int. Cl.
*B29C 45/14*   (2006.01)
*B29D 99/00*   (2010.01)
(Continued)

(52) U.S. Cl.
CPC ........ *B29C 45/14311* (2013.01); *B29B 11/10* (2013.01); *B29B 11/16* (2013.01);
(Continued)

(58) Field of Classification Search
CPC ... B29B 11/10; B29B 11/16; B29C 45/14065; B29C 45/14311; B29C 66/1222;
(Continued)

(56) References Cited

U.S. PATENT DOCUMENTS

| | | | | |
|---|---|---|---|---|
| 2,451,131 | A | * | 10/1948 | Vidal ................... B21D 26/051 100/211 |
| 4,095,322 | A | * | 6/1978 | Scarpati ................ B29C 70/345 156/182 |

(Continued)

FOREIGN PATENT DOCUMENTS

| | | |
|---|---|---|
| CN | 101255847 A | 9/2008 |
| CN | 102124215 A | 7/2011 |

(Continued)

OTHER PUBLICATIONS

European Patent Office, International Search Report and Written Opinion issued in International Application No. PCT/DK2014/050210 dated May 8, 2015.

(Continued)

*Primary Examiner* — Aaron R Eastman
*Assistant Examiner* — Adam W Brown
(74) *Attorney, Agent, or Firm* — Wood Herron & Evans LLP

(57) ABSTRACT

The invention relates to a method of manufacturing a shell part (101) for a wind turbine blade also comprising an add-on component (301, 302) connected to the shell part (101) along a connection face. The method comprises the steps of providing an insert (102) with a side surface of approximately the same shape as the connection face, positioning the insert in an open mould, and placing one or more layers (105) of material in the mould (103) to form the shell part (101) wherein the layers (105) are placed in abutment to the side surface (104) of the insert (102) thereby forming a side surface (108) of the shell part (101) of approximately the same shape as the connection face. After resin cure, the insert (102) is removed. The invention further relates to a method of manufacturing a wind turbine blade shell member (100) comprising such a shell part (101), and layers (105) of material are placed in the mould (103) in abutment to the (Continued)

side surface (108) of the shell part (101) to form the add-on component (301, 302).

24 Claims, 1 Drawing Sheet

(51) Int. Cl.
| | | |
|---|---|---|
| *B29B 11/10* | (2006.01) | |
| *B29B 11/16* | (2006.01) | |
| *F03D 1/06* | (2006.01) | |
| *B29L 31/08* | (2006.01) | |
| *B29C 65/00* | (2006.01) | |
| *B29C 70/48* | (2006.01) | |
| *B29C 70/44* | (2006.01) | |
| *B29K 105/20* | (2006.01) | |
| *B29K 631/00* | (2006.01) | |
| *B29K 663/00* | (2006.01) | |
| *B29K 707/04* | (2006.01) | |
| *B29K 709/08* | (2006.01) | |

(52) U.S. Cl.
CPC .... *B29C 45/14065* (2013.01); *B29D 99/0028* (2013.01); *F03D 1/0675* (2013.01); *B29C 66/1222* (2013.01); *B29C 66/1224* (2013.01); *B29C 66/1226* (2013.01); *B29C 66/543* (2013.01); *B29C 66/63* (2013.01); *B29C 66/71* (2013.01); *B29C 66/7212* (2013.01); *B29C 66/73941* (2013.01); *B29C 70/443* (2013.01); *B29C 70/48* (2013.01); *B29C 2045/14114* (2013.01); *B29K 2105/20* (2013.01); *B29K 2631/00* (2013.01); *B29K 2663/00* (2013.01); *B29K 2707/04* (2013.01); *B29K 2709/08* (2013.01); *B29K 2995/0078* (2013.01); *B29L 2031/085* (2013.01); *Y02E 10/721* (2013.01); *Y02P 70/523* (2015.11)

(58) Field of Classification Search
CPC ............ B29C 66/1224; B29C 66/1226; B29C 66/543; B29C 66/63; B29C 66/71; B29C 66/7212; B29C 66/73941; B29C 70/443; B29C 70/48; B29C 2045/14114; B29D 99/0028; B29K 2105/20; B29K 2631/00; B29K 2663/00; B29K 2707/04; B29K 2709/08; B29K 2995/0078; B29L 2031/085; F03D 1/0675; Y02E 10/721; Y02P 70/523

See application file for complete search history.

(56) References Cited

U.S. PATENT DOCUMENTS

| | | | | |
|---|---|---|---|---|
| 4,643,646 | A * | 2/1987 | Hahn | B64C 27/473 |
| | | | | 416/226 |
| 6,638,466 | B1 * | 10/2003 | Abbott | B29C 33/68 |
| | | | | 264/238 |
| 8,066,504 | B2 * | 11/2011 | Callis | B29C 33/485 |
| | | | | 29/428 |
| 2010/0068065 | A1 * | 3/2010 | Jensen | F03D 1/0641 |
| | | | | 416/241 R |
| 2011/0052407 | A1 | 3/2011 | Zuteck | |
| 2011/0221093 | A1 * | 9/2011 | Perrow | B29C 70/44 |
| | | | | 264/255 |
| 2013/0011269 | A1 | 1/2013 | Gainnozzi et al. | |
| 2013/0189114 | A1 * | 7/2013 | Jenzewski | B29C 70/443 |
| | | | | 416/229 R |

FOREIGN PATENT DOCUMENTS

| | | |
|---|---|---|
| CN | 103108744 A | 5/2013 |
| EP | 2153964 A1 | 2/2010 |
| GB | 2481415 A | 12/2011 |
| WO | 9728972 A1 | 8/1997 |
| WO | 2009139619 A1 | 11/2009 |
| WO | 2011113812 A1 | 9/2011 |
| WO | 2012019610 A1 | 2/2012 |
| WO | 2012140039 A2 | 10/2012 |
| WO | 20130001459 A1 | 1/2013 |
| WO | 2013061016 A1 | 5/2013 |

OTHER PUBLICATIONS

Danish Patent and Trademark Office, Search Report issued in Application No. PA 2013 70393 dated May 8, 2014.
The State Intellectual Property Office of China, First Notification of Office Action in CN Application No. 201480048857.9, dated Nov. 15, 2016.
The State Intellectual Property Office of China, Second Office Action in CN Application No. 201480048857.9, dated Jan. 22, 2017.

* cited by examiner

WIND TURBINE BLADE

FIELD OF THE INVENTION

The present invention relates to a method of manufacturing a part of a wind turbine blade shell member where the wind turbine blade shell member comprises the shell part and an add-on component connected along a connection face. The invention further relates to a wind turbine blade comprising a shell part manufactured according to such method.

BACKGROUND

Modern wind turbines comprise a plurality of wind turbine rotor blades, typically three blades, each blade having a weight of up to 35 tons and a length of up to 80 meters or longer.

As the size of wind turbines and thus wind turbine blades are still growing, the production facilities and the transport means must be increased to handle blades of the required size. This also increases the demand on logistics and increases the associated costs.

Also, the different parts of a wind turbine blade have different requirements to factors such as the material and structural properties and to the manufacturing processes. This can lead to the blade manufacturing process being complex, labour intensive, and prolonging the production time. As an example the shape and stiffness of the trailing edge significantly influence the overall aeroelastic parameters of the blade as well as the level of noise emitted from the blade. Also, the often rather sharp trailing edge makes this blade part especially sensitive and prone to damage during manufacture and transport. The trailing edge therefore often involves the use of other materials or additional manufacturing steps than for the remaining blade shell.

Wind turbine blades manufactured in parts or in sections for later joining are known. However, there may be problems with obtaining the necessary precision and strength of the joints between the connected blade parts and for safe transfer of loads and moments across the joint. Further, difficulties may arise in connecting the often very large sections without jeopardizing the final shape, stiffness and weight considerations on the blades.

DESCRIPTION OF THE INVENTION

It is therefore an object of embodiments of the present invention to overcome or at least reduce some or all of the above described disadvantages of the known wind turbine blades manufactured in parts and to provide an improved method of manufacturing such a blade.

A further object of embodiments of the invention is to provide a wind turbine blade which may be manufactured effectively in sections or in parts yet assembled with sufficient joint precision, strength, and stiffness.

A further object of embodiments of the inventions is to provide an efficient method of manufacture of such parts of blade shells prepared for joining and later connection to another component.

A further object is to provide a method for the manufacture of a part of a wind turbine with improved control on the geometry of bonding or joining surfaces.

A further object of the invention is to provide a method reducing the costs on tooling and moulds for the production of wind turbine blades.

In accordance with the invention this is obtained by a method of manufacturing a part of a wind turbine blade shell member, wherein the wind turbine blade shell member comprises the shell part and an add-on component connected along a connection face. The method comprises providing an insert with a side surface of approximately the same shape as the connection face, positioning the insert in an open mould, and placing one or more layers of material in the mould to form the shell part wherein the layers are placed in abutment to the side surface of the insert thereby forming a side surface of the shell part of approximately the same shape as the connection face. The method further comprises providing a resin to the layers and allowing the resin to at least partly cure and removing the insert.

The wind turbine blade shell member may form the entire wind turbine shell, or the leeward side shell or the windward side shell, or a portion hereof. The wind turbine blade shell member may comprise one or more spar caps acting as reinforcing beams running lengthways in the shell, i.e. in the longitudinal direction of the blade.

The add-on component may for example form a trailing edge portion or a leading edge portion of the wind turbine blade, flap parts, or a tip portion, or a root portion of the blade. The add-on component may also or alternatively form the main portion of the wind turbine shell member and the shell part form e.g. a leading or trailing edge portion or a tip or root portion of the blade. The add-on component may be pre-manufactured and bonded onto the blade shell part when placed in the mould or later after demoulding.

The connection face forms the joint face between the shell part and the add-on component when connected.

The method step of providing a resin to the layers may comprise injection and/or infusion of resin to the layers placed in the mould. Additionally or alternatively the resin may be provided by the use of pre-impregnated material. The pre-impregnated material may form one or more of the layers of material or may be a material placed in the mould additional to the layers.

By the use of an insert in the manufacturing method according to the above is obtained that components of the wind turbine shell can be omitted during the building in a first step but in such a way that the components can be bonded effectively to the shell part later. The insert in the mould enables precise side surface details to be incorporated in the shell part of the blade. Also the insert ensures a more precise position and shape of the side surface of the shell part and thereby of the later joint line to the add-on component. Hereby the shell part is prepared for an effective connection to the add-on component where the precise side surface details and geometry enables a connection and a joint of a well-controlled geometry and therefore with a high strength.

The proposed method and use of the insert means that you can obtain a connection face of different and potentially more complex shapes than possible without the use of an insert. Traditionally, a shell part to be connected to another part is laid up with a gradual or tapered side surface. According to the invention, the connection face and thereby joint geometry is given by the shape and geometry of the side surface of the insert and it can thereby be controlled and well-defined with a predefined and fixed geometry. It is hereby possible to make, for example, a more trim surface of joint line, or to make, for example, a trapped or stepped joint, or fingers or dentations for increased joint strength.

Due to the well-controlled position and geometry of the side surface of the shell part, the shell part does not need, or only minimally needs to be processed or machined before connection to the add-on component. Hereby the production time and cost is reduced significantly while at the same time obtaining connections and joints of increased quality and strength.

The proposed method allows the construction and preparation of wind turbine blade shell members with components or sections missing. As mentioned above these add-on components could, for example, be parts of the blade leading edge section or trailing edge section or a tip portion. This then allows these add-on components to be manufactured differently to the shell part for example by a different manufacturing method more optimal for the component, or to allow tailoring to specific requirements such as enhanced erosion properties, low cost, low weight, lightning protection means etc. The add-on component could likewise advantageously be manufactured separately to thereby be able to use for example different materials such as a different resin otherwise incompatible with the manufacturing process of the shell part, or to use pre-impregnated materials in either the add-on component or the shell part but resin impregnation in the other. In another example, the shell part may be formed from a first material, such as carbon fibre reinforced plastic and the add-on component is formed from a second component such as glass reinforced plastic.

The proposed method is further advantageous in allowing for the reuse of the mould for different purposes. Due to the very large size of modern wind turbine blades, the moulds are extremely expensive. Further, only very few moulds are prepared for each blade type due to their size and their cost. Therefore it is advantageous to be able to reuse the same mould for different purposes, —both for the traditional manufacture of one blade shell member in one piece, for the manufacture of the shell part prepared for connection to the add-on components which may also be performed later in the mould, and/or for the manufacture of the add-on components separately. The tooling expenses are hereby greatly reduced.

The proposed method further advantageously allows for the add-on component to be connected to the shell part after the blade shell part has been demoulded or while the shell part is still in the mould. Hereby the connection of the shell part and the add-on component may be performed as most efficient in view of the production line and the available production facilities.

In an embodiment of the invention, the shell part forms at least a central portion of the wind turbine blade shell extending from a root region to a tip region.

In an embodiment of the invention the add-on component forms at least a part of a blade trailing edge, a blade leading edge, and/or a blade tip.

As mentioned previously this allows for the manufacture of modular blades where the different modules and the main part of the blade shell may be manufactured in different processes, at different times as convenient, and/or in different places. Further, this allows for the main part of the wind turbine shell to be retrofitted with e.g. one trailing edge optimal for the specific wind turbine site out of a series of different trailing edges or e.g. meeting special demands such as to noise emission etc.

The shell part and add-on component may be connected later such as closer to or at the erection site. This may simplify the transportation of the wind turbine blade greatly.

In an embodiment of the invention, the side surface of the insert is provided with an angled surface portion so that the shell part is adapted to be connected to the add-on component in a scarf joint. Hereby is obtained a surface side of the shell part with a well-controlled geometry and thereby a well-controlled geometry of the joint to the add-on component. The angled surface portion enables the shell part and add-on component to be connected in a scarf joint yielding increased contact surface area between the connecting part and thereby a high joint strength.

In an embodiment of the invention the side surface of the insert is provided with a stepped surface. This enables different types of stepped joints between the shell part and add-on component and the possibility to obtain a joint or connection of high precision and strength.

In a further embodiment of the invention the side surface of the insert is provided with surface portions at different angles whereby different types of joints such as joints of dentations or fingers, hooked scarf joints, or double sided scarfed joints may be obtained between the shell part and add-on component.

The geometry of the side surface of the insert according to the embodiments above further allows for different geometries of the side surface of the shell part where at the abutment of the shell part to the insert both the insert can form the outermost part or the shell part can form the outermost part against the mould surface.

In an embodiment, the insert is positioned in the mould according to a marker in or on the mould indicating a desired position of the insert relative to the mould and/or positioned in the mould such as to follow an outer edge of the mould. Hereby is obtained a precise positioning of the insert and thereby a precise geometry of the side surface of the shell part and the later joint between the shell part and the add-on component. Further, this allows for repeatedly obtaining the same position of the insert and thereby of the joint line when producing more shell parts.

In a further embodiment, the method further comprises the step of at least temporarily fixating the insert to the mould such as by an adhesive, such as a curable or non-curable hot-melt resin or by a double-coated tape; or a mechanical fastening means, such as a clamp, wires, or an elastic member. Hereby the insert can be held effectively in position by simple means improving the precision of the geometry and position of the side surface and thereby of the joint.

According to an embodiment of the invention, the method further comprises the step of placing an outer surface layer material and/or an inner surface layer material in the mould. This may for example be layer of gel coat and/or resin distribution layers. Additionally or alternatively such inner and/or outer layers may comprise infused inner and outer skins.

In an embodiment, the method comprises the step of placing one or more elements of a different material in the mould such as for example pultruded slabs of fibre-reinforced material and/or blocks of a core material.

According to an embodiment of the invention, the step of providing a resin comprises placing one or more layers of pre-impregnated material in the mould and/or at least partly impregnating the layers with the resin. The shell part may be manufactured with all the resin provided in pre-impregnated materials, or with all the resin provided by resin injection or resin infusion, or by combinations hereof.

In a further embodiment the layers of material comprise fibre-reinforced sheet material such as glass fibres and/or carbon; and the resin comprises a thermosetting resin, such as an epoxy-based resin or a vinyl ester-based resin.

According to a further embodiment, the insert is made of a plastic, wood, metal or combinations hereof. Hereby the insert made be made at relatively low cost yet with the possibility to make the insert with a detailed side surface to obtain a precise and well-controlled side surface of the shell part. The insert may be coated with a material such as silicone so that the shell part does not adhere to the insert.

The invention further concerns a wind turbine blade comprising a wind turbine blade shell part manufactured according to any of embodiments of the method as described above. The advantages hereof are as described in relation to the method.

The invention further concerns a method of manufacturing a wind turbine blade shell member comprising a shell part manufactured as described in the previous, and where the method further comprises placing layers of material in the mould to form the add-on component wherein the layers are placed in abutment to the side surface of the shell part, and introducing a resin to the layers and allowing the resin to at least partly cure to bond the add-on component to the shell part. Hereby the connection of the shell part and the add-on component can be performed in the same mould as the production of the blade shell part. Hereby the tooling expenses are reduced.

Further, the proposed method allows for the shell part to be manufactured differently from the add-on component, for example by different materials such as different resin types, or different process parameters such as different temperatures or pressure, yet obtaining a precise, well-controlled and strong bond between the two connecting members. Further, the method advantageously allows for the bonding of the shell part and the add-on component without the need for intermediate preparation or adaption of the connecting surfaces to obtain the desired fit.

Furthermore, the connection and bonding of the add-on component onto the shell part may be established without demoulding of the shell part first. Further advantages are as mentioned previously in relation to the manufacturing method of the shell part.

In a further aspect, the invention provides a method of manufacturing a wind turbine blade shell member comprising a shell part manufactured as described in the previous and where the method further comprises providing the add-on component and bonding the add-on component to the shell part. Hereby the add-on component may be pre-manufactured in the same or in another mould or mould part as the shell part.

A further aspect of the invention relates to a method of manufacturing a wind turbine blade comprising an upper shell and a lower shell, the method comprising manufacturing two shell parts according to the methods described in the above to form a part of the upper shell of the blade and a part of the lower shell of the blade, and connecting the shell parts by one or more interconnecting shear webs extending in a longitudinal direction of the blade and between the two shell parts. Further the method comprises providing an add-on component, and connecting the add-on component to the two shell parts. Hereby is obtained a method of manufacturing a wind turbine blade in modules, where the add-on component(s) can be connected and bonded to the main part of the wind turbine blade shell after the upper and lower shell parts of the blade have been prepared and connected by webs. Hereby the position of the joints between the different parts and components of the blade can be moved away from the more troublesome or complicated positions such as at the leading edge or at the trailing edge, and instead placed for example where the area of the contacting faces are larger and/or where the aeroelastic properties of the wind turbine blade are not so easily affected.

BRIEF DESCRIPTION OF THE DRAWINGS

In the following different embodiments of the invention will be described with reference to the drawings, wherein.

DETAILED DESCRIPTION OF THE DRAWINGS

Figure 1:
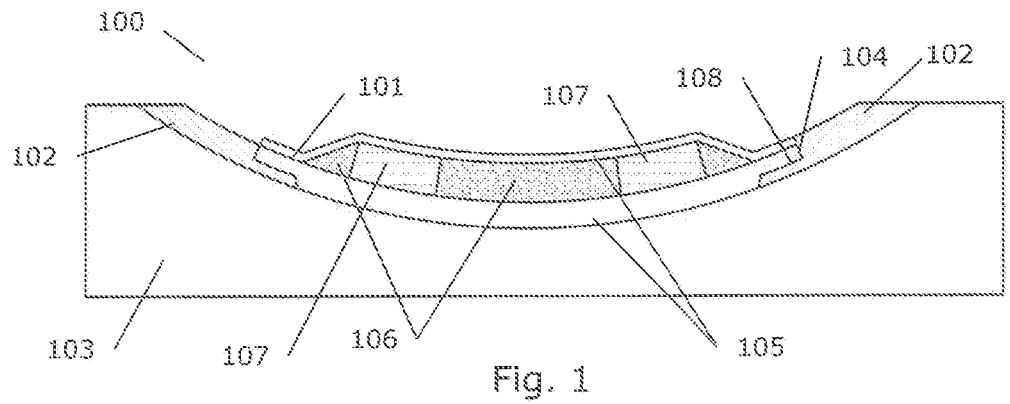
FIG. 1 shows a mould for a wind turbine blade with the build-up of a shell part using an insert as seen in a cross sectional view.

FIG. 1 illustrates the manufacture and lay-up of a part 101 of a wind turbine blade shell (seen in a cross sectional view) according to an embodiment of the invention. Here a shell member 100 of a wind turbine is laid up in the mould 103, but parts of the leading edge and trailing edge are omitted to be later added as add-on components. Instead inserts 102 are placed in the mould 103. The inserts each comprise a side surface 104 of a shape corresponding to the desired shape of the connection face between the shell part 101 and the add-on components.

Layers of material 105 such as inner and outer skins are then placed in the mould to form the shell part. The layers may comprise layers of fibre-reinforced material such as woven or non-woven sheets or layers of UD material. Some or all of the layers may be pre-impregnated with resin or resin may be introduced into the mould by infusion or injection. Also further elements constituting the blade shell may be placed in the mould, such as spar caps 107 and core elements 106 in between. The spar caps may advantageously comprise pultruded slabs of carbon fibre-reinforced material, and the core material may typically be materials of low weight such as foam materials or balsa.

The layers 105 of the shell part are placed in abutment to the side surface 104 of the insert 102. Hereby a side surface 108 of the shell part is formed which is of approximately the same shape as the desired connection face between the shell part and the add-on components to be connected. The resin is then allowed to cure at least partly and the inserts are removed. The hereby manufactured shell part may then be demoulded or may be left in the mould to be bonded to the add-on component(s).

The add-on components may be pre-manufactured (for example in the same mould 103) or may be build-up and cured onto the blade shell directly in the mould.

As outlined in FIG. 1, the surface side 104 of the insert may have for example stepped surface portions or surface portions at different angles. Hereby the surface side 108 of the shell part is shaped correspondingly to yield joints of different types when connected to the add-on components. For example different variations of stepped, finger, or scarf joints or the joggle feature as sketched in FIG. 1.

Figure 2:
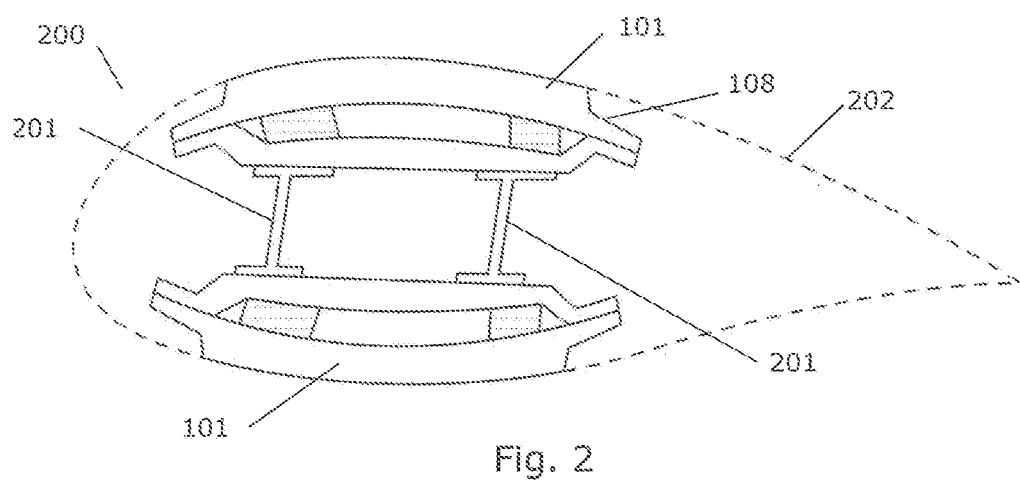
FIG. 2 illustrates in a cross sectional view the connection of two shell parts according to an embodiment of the invention.

FIG. 2 illustrates in a cross sectional view the two shell parts 101 connected by shear webs 201. The dashed lines 202 show the outline of the desired final shape of the wind turbine blade 200. The side surfaces 108 of the shell parts 101 have been shaped by means of inserts as described in relation to FIG. 1, and therefore correspond to the corresponding side surfaces of the add-on components to be joined to the shell parts.

Figure 3:
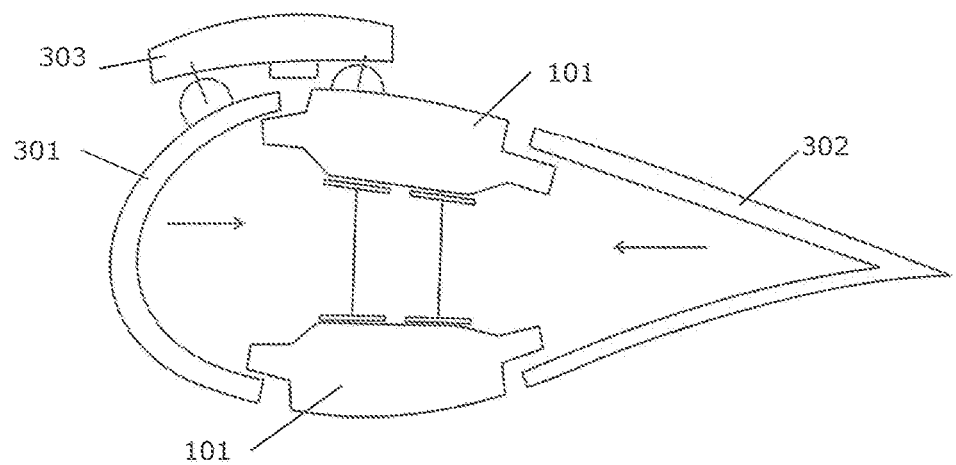
FIG. 3 illustrates the steps in manufacturing a sectional blade according to embodiments of the invention by the connection of the connection of a trailing edge and a leading edge to the blade illustrated in FIG. 2.

In the embodiment shown in FIGS. 2 and 3, the leading edge 301 and the trailing edge 302 form two pre-manufactured add-on components. These are then bonded onto the connected shell parts 101 in a separate operation. A jig 303 is provided which locates and attaches the shell parts 101 and the add-on components to each other. This allows for the leading and trailing edges to be fabricated in separate processes optimized for optimal manufacture of these components.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of manufacturing a part of a wind turbine blade shell member, the wind turbine blade shell member comprising the shell part and an add-on component connected along a connection face, which method comprises:
    providing an insert with a side surface of approximately the same shape as the connection face;
    positioning the insert in an open mould while maintaining the mould in an open configuration;
    placing one or more layers of material in the mould while continuing to maintain the mould in the open configuration to form the shell part wherein the layers are placed in abutment to the side surface of the insert thereby forming a side surface of the shell part of approximately the same shape as the connection face;
    providing a resin to the layers and allowing the resin to at least partly cure; and
    removing said insert.

2. A method according to claim 1, wherein the shell part forms at least a central portion of the wind turbine blade shell extending from a root region to a tip region.

3. A method according to claim 1, wherein the add-on component forms at least a part of a blade trailing edge, a blade leading edge, and/or a blade tip.

4. A method according to claim 1 wherein the side surface of the insert is provided with an angled surface portion so that the shell part is adapted to be connected to the add-on component in a scarf joint.

5. A method according to claim 1 wherein the side surface of the insert is provided with a stepped surface.

6. A method according to claim 1 wherein the side surface of the insert is provided with surface portions at different angles.

7. A method according to claim 1, wherein the insert is positioned in the mould according to a marker in or on the mould indicating a desired position of the insert relative to the mould.

8. A method according to claim 1, wherein the insert is positioned in the mould such as to follow an outer edge of the mould.

9. A method according to claim 1, further comprising the step of at least temporarily fixating the insert to the mould.

10. A method according to claim 9, wherein the insert is fixated to the mould by an adhesive or by a double-coated tape or by a mechanical fastening means.

11. A method according to claim 1, further comprising the step of placing an outer surface layer material and/or an inner surface layer material in the mould.

12. A method according to claim 1, further comprising the step of placing one or more elements of a different material in the mould.

13. A method according to claim 12, wherein the elements comprise pultruded slabs of fibre-reinforced material and/or blocks of a core material.

14. A method according to claim 1, wherein the step of providing a resin comprises placing one or more layers of pre-impregnated material in the mould and/or at least partly impregnating the layers with the resin.

15. A method according to claim 1, wherein the layers of material comprise fibre-reinforced sheet material; and the resin comprises a thermosetting resin.

16. A method according to claim 1, wherein the insert is made of a plastic, wood, metal or combinations hereof.

17. A wind turbine blade comprising a wind turbine blade shell part manufactured according to the method of claim 1.

18. A method of manufacturing a wind turbine blade shell member comprising a shell part manufactured according claim 1, the method further comprising providing the add-on component and bonding the add-on component to the shell part.

19. A method of manufacturing a wind turbine blade comprising an upper shell and a lower shell, the method comprising manufacturing two shell parts according to claim 1 to form a part of the upper shell of the blade and a part of the lower shell of the blade; connecting the shell parts by one or more interconnecting spar webs extending in a longitudinal direction of the blade and between the two shell parts;
    providing an add-on component; and connecting the add-on component to the two shell parts.

20. The method of claim 1, wherein positioning the insert in the open mould is performed prior to placing the one or more layers of material in the mould.

21. The method of claim 1, wherein at least a portion of the insert is between the open mould and the one or more layers of material.

22. The method of claim 1, wherein positioning the insert in the open mould includes positioning the insert against a surface of the open mould.

23. A method of manufacturing a wind turbine blade shell member, the wind turbine blade shell member comprising the shell part and an add-on component connected along a connection face, which method comprises:
    providing an insert with a side surface of approximately the same shape as the connection face;
    positioning the insert in an open mould;
    placing one or more layers of material in the mould to form the shell part wherein the layers are placed in abutment to the side surface of the insert thereby forming a side surface of the shell part of approximately the same shape as the connection face;
    providing a resin to the layers and allowing the resin to at least partly cure;
    removing said insert;
    placing layers of material in the mould to form the add-on component wherein the layers are placed in abutment to the side surface of the shell part; and
    introducing a resin to the layers and allowing the resin to at least partly cure to bond the add-on component to the shell part.

24. The method of claim 1, wherein providing a resin to the layers and allowing the resin to at least partly cure are performed after placing the one or more layers of material in the mould.

* * * * *